US010921821B2

(12) United States Patent
Lesher et al.

(10) Patent No.: US 10,921,821 B2
(45) Date of Patent: Feb. 16, 2021

(54) DETERMINING AND USING BRAKING CAPABILITIES OF VEHICLES FOR PLATOONING DECELERATION OPERATIONS

(71) Applicant: Bendix Commercial Vehicle Systems LLC, Elyria, OH (US)

(72) Inventors: Michael K Lesher, North Ridgeville, OH (US); T. Stephen Miller, Jr., Lagrange, OH (US); Joseph M Macnamara, Ashland, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 310 days.

(21) Appl. No.: 15/850,942

(22) Filed: Dec. 21, 2017

(65) Prior Publication Data

US 2019/0196501 A1    Jun. 27, 2019

(51) Int. Cl.
*G05D 1/02* (2020.01)
*B60T 8/172* (2006.01)
(Continued)

(52) U.S. Cl.
CPC .............. *G05D 1/0289* (2013.01); *B60T 7/22* (2013.01); *B60T 8/172* (2013.01); *B60T 8/1708* (2013.01);
(Continued)

(58) Field of Classification Search
CPC .. G05D 1/0289; G05D 1/0276; G05D 1/0291; G05D 1/0293; B60T 7/22;
(Continued)

(56) References Cited

U.S. PATENT DOCUMENTS 6,878,096 B1 *  4/2005  Winner ................... B60T 1/062
                                                     477/186
8,660,779 B2    2/2014  Shida
(Continued)

FOREIGN PATENT DOCUMENTS

DE    102008026686 A1    12/2009
EP         2390856 A1    11/2011
(Continued)

OTHER PUBLICATIONS

ATA Technology and Maintenance Council Future Truck Program "Automated Driving and Platooning Issues and Opportunities", Sep. 21, 2015; 48 pages.
(Continued)

*Primary Examiner* — Krishnan Ramesh
(74) *Attorney, Agent, or Firm* — Tucker Ellis LLP

(57) ABSTRACT

Platoon management control systems and methods arrange two or more vehicles cooperatively travelling seriatim as a platoon along an associated roadway into a platoon arrangement in accordance with their relative braking capabilities and other brake-related performance characteristics such as braking efficiency. Braking efficiency can change over time and is in general affected by many factors such as brake temperature, brake type, burnishing, vehicle weight, number of tires, tire wear, vehicle loading, road surface type and weather conditions. The relative braking capabilities are learned or otherwise calculated or determined in each vehicle and shared between the vehicles of the platoon. The platoon may be reorganized based on differences between the learned or otherwise calculated or determined relative braking capabilities. Desired gaps between the platooning vehicles may be increased or decreased in accordance with the learned or otherwise calculated or determined relative braking capabilities as necessary or desired.

20 Claims, 11 Drawing Sheets

(51) Int. Cl.
*B60T 8/32* (2006.01)
*G08G 1/16* (2006.01)
*G01S 13/931* (2020.01)
*G08G 1/00* (2006.01)
*B60T 8/17* (2006.01)
*B60T 7/22* (2006.01)

(52) U.S. Cl.
CPC ............ *B60T 8/329* (2013.01); *G01S 13/931* (2013.01); *G05D 1/0276* (2013.01); *G05D 1/0287* (2013.01); *G05D 1/0291* (2013.01); *G05D 1/0293* (2013.01); *G05D 1/0295* (2013.01); *G08G 1/163* (2013.01); *G08G 1/166* (2013.01); *G08G 1/22* (2013.01); *B60T 2201/022* (2013.01); *B60T 2201/024* (2013.01); *G01S 2013/9316* (2020.01); *G01S 2013/9325* (2013.01); *G01S 2013/93185* (2020.01); *G05D 2201/0213* (2013.01)

(58) Field of Classification Search
CPC ........ B60T 8/1708; B60T 8/172; B60T 8/329; B60T 2201/022; B60T 2201/024; B60T 2201/9325; G01S 13/931; B01S 2013/9346; B01S 2013/936
USPC .......................................................... 701/96
See application file for complete search history.

(56) References Cited

U.S. PATENT DOCUMENTS

| | | | |
|---|---|---|---|
| 9,632,507 | B1 | 4/2017 | Korn |
| 9,783,064 | B2* | 10/2017 | Maiterth .................. B60L 7/22 |
| 10,096,067 | B1* | 10/2018 | Slusar ..................... G06Q 40/08 |
| 2010/0256835 | A1 | 10/2010 | Mudalige |
| 2012/0109421 | A1 | 5/2012 | Scarloa |
| 2013/0041567 | A1 | 2/2013 | Yamashiro |
| 2014/0316671 | A1* | 10/2014 | Okamoto ................. G08G 1/22 701/96 |
| 2015/0232097 | A1* | 8/2015 | Luther .................... B61L 3/006 701/123 |
| 2016/0274591 | A1 | 9/2016 | Bick et al. |
| 2017/0329348 | A1 | 11/2017 | Li et al. |
| 2018/0086325 | A1* | 3/2018 | Mannherz ............... B60T 8/172 |
| 2018/0148023 | A1* | 5/2018 | Mannherz ............... B60T 13/74 |
| 2018/0210462 | A1* | 7/2018 | Switkes ............... G05D 1/0295 |
| 2020/0027355 | A1* | 1/2020 | Sujan ................... G05D 1/0295 |

FOREIGN PATENT DOCUMENTS

| | | |
|---|---|---|
| JP | H10293899 A | 11/1998 |
| JP | 3633709 B2 | 3/2005 |
| JP | 2008204094 A | 9/2008 |
| JP | 2010117771 A | 5/2010 |
| WO | 2016013996 A1 | 1/2016 |
| WO | 2016134770 A1 | 9/2016 |
| WO | 2017210200 A1 | 12/2017 |

OTHER PUBLICATIONS

International Search Report and Written Opinion for corresponding International application No. PCT/US2018/066738, dated Jun. 4, 2019.

Ishizaka et al., "A New Concept of Brake System for ITS Platoon Heavy Duty Trucks and Its Pre-evaluation", 14th International IEEE Conference on Intelligent Transportation Systems, Oct. 5-7, 2011, pp. 1063-1068, Washington, DC, USA.

Freund, D. et al., "Commercial Vehicle Safety Technologies: Applications for Brake Performance Monitoring", Paper, Federal Motor Carrier Safety Administration, pp. 1-14, Paper No. 09-0097, USA.

MGM Brakes, "Electronic Brake Monitoring", Sales Flier, Form No. 5091, 2 pages, Revised Jul. 201, printed in the USA.

Lin, M., et al., "A Study and Analysis for Calculating the Brake-application Time of AEB Systems Considering the Gradient", Paper, International Journal of Control and Automation, vol. 8, No. 6 (2015). pp. 283-292, Korea.

* cited by examiner

DETERMINING AND USING BRAKING CAPABILITIES OF VEHICLES FOR PLATOONING DECELERATION OPERATIONS

CROSS REFERENCE TO RELATED APPLICATIONS

This application is related to U.S. application Ser. No. 15/395,160, filed Dec. 30, 2016, entitled: VARYING THE DISTANCE BETWEEN VEHICLES IN A PLATOON; U.S. application Ser. No. 15/395,219, filed Dec. 30, 2016, entitled: SELF-ORDERING OF FLEET VEHICLES IN A PLATOON; U.S. application Ser. No. 15/395,251, filed Dec. 30, 2016, entitled: DETECTION OF EXTRA-PLATOON VEHICLE INTERMEDIATE OR ADJACENT TO PLATOON MEMBER VEHICLES; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

TECHNICAL FIELD

The embodiments herein relate generally to highway vehicle platoon management. More specifically, particular embodiments relate to commercial highway vehicle platoon management where it is desirable to arrange two or more vehicles cooperatively travelling as a platoon along an associated roadway into a platoon arrangement in accordance with their relative braking capabilities and other brake-related performance characteristics. Although the embodiments will be described with reference to selected particular examples such as two or more vehicles cooperatively travelling seriatim as a platoon for example, it is to be appreciated that the claimed invention is also amenable to other applications and can be equivalently extended to other embodiments and environments.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, and larger platoons may involve multiple rows and/or columns of vehicles travelling in non-single file formations, but ensuring the safety of to both the platooned vehicles as well as of the other non-platooning vehicles on the roadway most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicles can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platoons that operate on public roadways, however, sometimes encounter conditions that require more complicated platoon arrangements and platooning control and maintenance operations. For example, many roadways are open to vehicular traffic including non-commercial private traffic having little or no interaction with the platooning vehicles other than sharing a common roadway. Sometimes in practice the non-platooning vehicles, typically comprising small fast automobiles, dart into the path of the platoon, typically comprising large heavily loaded trucks. Therefore and in the interest of protecting the lighter passenger traffic from inadvertent collision with platooning vehicles, a particular platoon order or arrangement has been devised. More particularly, in order to optimize the safety of non-platooning vehicles that might interfere with the leading or any other vehicle of the platoon group, many platoons are ordered so that the platoon vehicle that is capable of the highest deceleration is placed at the front of the platoon. This helps to mitigate the chance that the platoon leader will be unable to adequately decelerate in order to avoid a collision with the non-platooning vehicle darting into the path of the platoon. In this platoon topology, the platooning vehicles having the lightest braking capabilities or parameters are located at the back of the platoon chain. This platoon topology also gives the rear vehicle more time gap for braking.

In roadway vehicles, however, braking efficiency is affected by many factors such as brake temperature, brake type, burnishing, vehicle weight, number of tires, tire wear, vehicle loading, road surface type and weather conditions. In addition, the braking efficiency of any vehicle can also change over time, and also can change differently for each vehicle. One or more changes in braking capabilities and any other braking performance characteristics of a first vehicle of a set of platooning vehicles does not necessarily imply that any of the other vehicles of the set of platooning vehicles are experiencing the same one or more changes. That is, one or more changes in braking capabilities of a first vehicle in a platoon cannot reliably be imputed any of the other vehicles of the platoon. This makes the important platoon management of gap distances between the platooning vehicles more difficult.

Given the above, therefore, it will be helpful to dynamically learn or otherwise calculate or determine the braking capability and braking performance parameters of each platooning vehicle over time.

It would also be helpful to dynamically learn or otherwise calculate or determine the braking capability and braking performance parameters of each platooning vehicle relative to the other vehicles of the platoon over time, and to use the relative braking capability and braking performance parameters as criteria for determining the order of the vehicles of the platoon to maximize the safety of the non-platooning vehicles relative to the platooning vehicles.

SUMMARY OF THE EXAMPLE EMBODIMENTS

The embodiments herein provide for new and improved systems and methods for dynamically learning or otherwise calculating or determining the braking capability and braking performance parameters of each platooning vehicle over time.

The embodiments herein provide for new and improved systems and methods for dynamically learning or otherwise calculating or determining the braking capability and braking performance parameters of each platooning vehicle relative to the other vehicles of the platoon over time.

The embodiments herein provide for new and improved systems and methods for using the relative braking capability and braking performance parameters of the platooning vehicles learned or otherwise calculated or determined over time as criteria for determining the order and/or re-ordering of the vehicles of the platoon to maximize the safety of the non-platooning vehicles relative to the platooning vehicles.

In accordance with another aspect, a platoon management control system and method uses braking performance data representative of the braking capabilities of the platooning vehicles to manage the gap distances between the vehicles to help ensure that the vehicles do not collide during braking operations.

To optimize the safety of a platoon of vehicles, the vehicles are ordered so the vehicles that are capable of the highest deceleration are to the front of the platoon to protect the public and the lightest braking vehicles are to the back of the platoon. This also gives the rear vehicle more time gap for braking. Braking efficiency is affected by many factors such as brake temperature, brake type, burnishing, vehicle weight, number of tires, tire wear, vehicle loading, road surface type and weather conditions. Braking efficiency can also change over time. Accordingly, in an example embodiment herein, a method is provided to determine relative braking capability in order to determine or otherwise resolve one or more factor(s) of platoon order. Opportunistic braking is used to compute an error rate while following a non-platoon vehicle. When a forward vehicle slows down, the lead vehicle computes the desired deceleration needed to maintain a safe gap and sends the deceleration request to all the vehicles behind. Each vehicle attempts to brake at the transmitted rate to maintain their desired following distance. However, because of inefficiencies in braking, the demand may not be met fully on each vehicle. Each vehicle measures the distance to the next vehicle ahead using for example a method such as RADAR, and computes the distance error from the requested deceleration making a quantitate error rate. This error value, if grossly different to the vehicle ahead compared to the vehicles behind, selectively triggers resorting the platoon order based on the quantitate error rate. Conversely, if a non-lead platoon vehicle determines that the braking force available will not be possible using the available gap, an over-the-air message is sent to the forward non-lead platoon vehicle(s) to reduce their gap to a minimum giving the vehicle additional gap for braking. This substantially mitigates the chance of a collision.

In accordance with an example embodiment, a system is provided for determining a relative braking capability between an associated following vehicle and one or more vehicles of a set of platooning vehicles comprising an associated leading vehicle and one or more associated following vehicles cooperatively travelling as a platoon along an associated roadway. The system of the example embodiment includes a platoon control unit configured to be disposed in the associated following vehicle, a communication receiver operatively coupled with the platoon control unit, a vehicle speed sensor operatively coupled with the platoon control unit and configured to be disposed in the associated following vehicle (20), and a forward distance sensor (260) operatively coupled with the platoon control unit and configured to be disposed in the associated following vehicle (20). The platoon control unit comprises a processor, a non-transient memory device operatively coupled with the processor, and logic stored in the non-transient memory and executable by the processor to determine the relative braking capability. The communication receiver is operable to receive a deceleration command signal from the associated leading vehicle, the deceleration command signal comprising deceleration command data selectively usable by the associated following vehicle to effect a deceleration operation of the associated following vehicle. The vehicle speed sensor is operable to sense a relative speed between the associated following vehicle and the associated roadway, and generate relative speed data representative of the sensed relative speed between the associated following vehicle and the associated roadway. The forward distance sensor is operable to sense a relative position between the associated following vehicle and the associated leading vehicle, and generate relative distance data representative of the sensed relative position between the associated following vehicle and the associated leading vehicle. In the example embodiment, the logic of the platoon control unit is executable by the processor to generate first quantitative error rate data in accordance with a predetermined combination of the relative speed data, the relative distance data, and the deceleration command data. The first quantitative error rate data is representative of a difference between a commanded gap distance to be maintained between the following and leading vehicles and the relative distance between the following and leading vehicles sensed by the forward distance sensor. Further in the example embodiment, the logic of the platoon control unit is executable by the processor to store the first quantitative error rate data in the non-transient memory device.

In addition, in the example embodiment, the vehicle speed sensor is operable to sense the relative speed between the associated following vehicle and the associated roadway during the deceleration operation effected by the associated following vehicle, and the forward distance sensor is operable to sense the relative position between the associated following vehicle and the associated leading vehicle during the deceleration operation effected by the associated following vehicle.

In accordance with a further example embodiment, a method is provided for determining a relative braking capability between an associated following vehicle and one or more vehicles of a set of platooning vehicles comprising an associated leading vehicle and one or more associated following vehicles cooperatively travelling as a platoon along an associated roadway. The method of the example embodiment includes providing a platoon control unit in the associated following vehicle, the platoon control unit comprising a processor, a non-transient memory device operatively coupled with the processor, and logic stored in the non-transient memory and executable by the processor to determine the relative braking capability. The method further includes receiving, by a communication receiver operatively coupled with the platoon control unit, a deceleration command signal from the associated leading vehicle, the deceleration command signal comprising deceleration command data selectively usable by the associated following vehicle to effect a deceleration operation of the associated following vehicle. The method further includes sensing, by a vehicle speed sensor operatively coupled with the platoon control unit and configured to be disposed in the associated following vehicle, a relative speed between the associated following vehicle and the associated roadway, and generating, by the vehicle speed sensor relative speed data representative of the sensed relative speed between the associated following vehicle and the associated roadway.

The method further includes sensing, by a forward distance sensor operatively coupled with the platoon control unit and configured to be disposed in the associated following vehicle, a relative position between the associated following vehicle and the associated leading vehicle, and generating, by the forward distance sensor, relative distance data representative of the sensed relative position between the associated following vehicle and the associated leading vehicle. The method further includes executing the logic of the platoon control unit by the processor to generate first quantitative error rate data in accordance with a predetermined combination of the relative speed data, the relative distance data, and the deceleration command data, the first quantitative error rate data being representative of a difference between a commanded gap distance to be maintained between the following and leading vehicles and the relative distance between the following and leading vehicles sensed by the forward distance sensor. The method further includes executing the logic of the platoon control unit by the processor to store the first quantitative error rate data in the non-transient memory device. In the example embodiment, the sensing the relative speed between the associated following vehicle and the associated roadway by the vehicle speed sensor comprises sensing the relative speed between the associated following vehicle and the associated roadway during the deceleration operation effected by the associated following vehicle.

Further in the example embodiment, the sensing the relative position between the associated following vehicle and the associated leading vehicle by the forward distance sensor comprises sensing the relative position between the associated following vehicle and the associated leading vehicle during the deceleration operation effected by the associated following vehicle.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
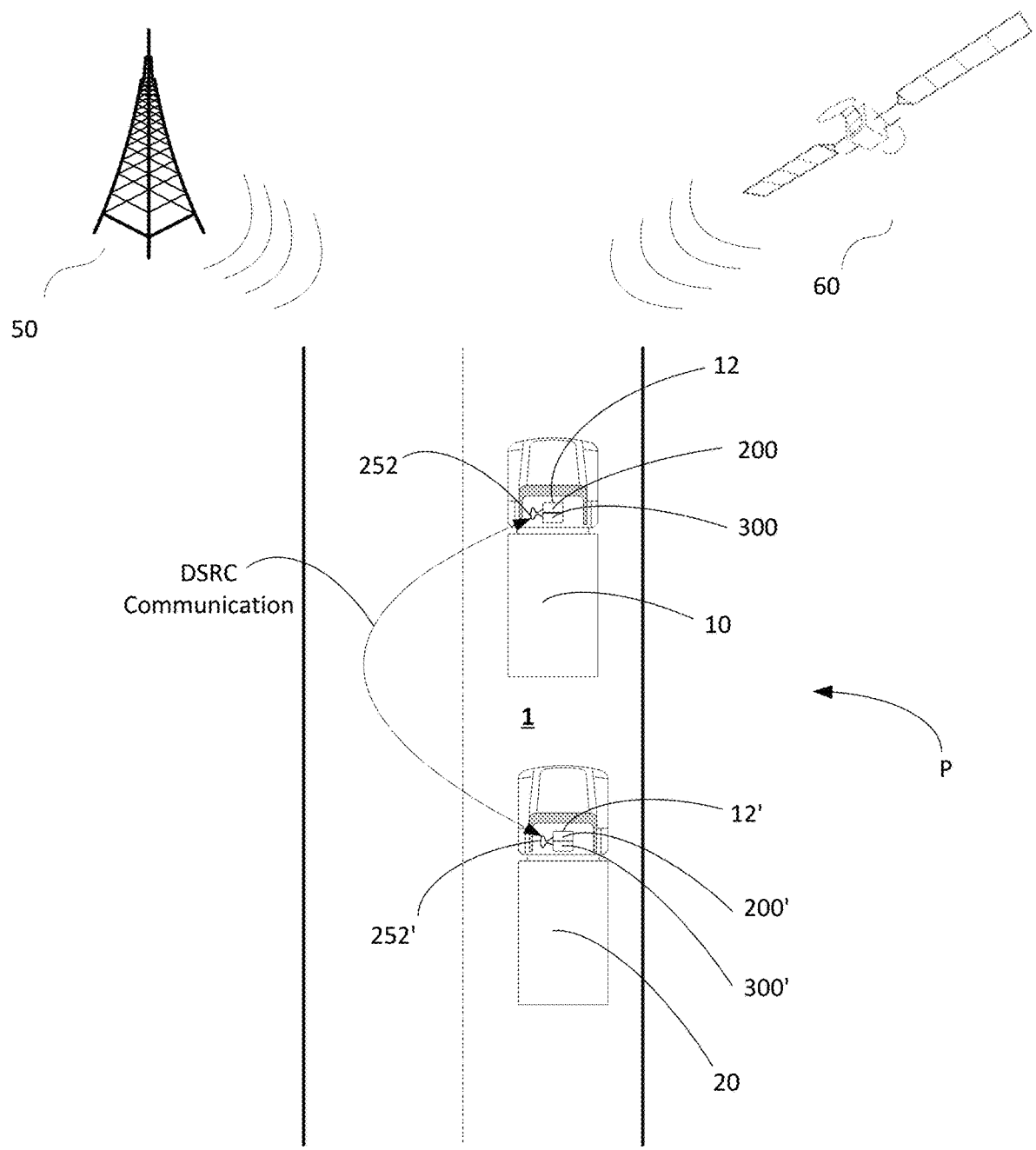
FIG. 1 is a schematic depiction of operation of an exemplary platoon in accordance with the embodiments.

Referring now to the drawings, wherein the showings are for the purpose of illustrating the example embodiments for rearrangement of vehicles onto non-columnar formations by way of example only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 seriatim in an ordered platoon P along a roadway 1. The leader vehicle 10 is provided with an electronic control system 12 which includes a data collection and communication module portion 200 and a platooning control portion 300 to be described in greater detail below. Similarly, the follower vehicle 20 is also provided with an electronic control system 12' which includes a data collection and communication module portion 200' and a platooning control portion 300'. In the example embodiments to be described herein, each of the two or more vehicles comprising the various platoons that will be described include the same or equivalent electronic control system 12, the same or equivalent data collection and communication module portion 200, and the same or equivalent platooning control portion 300, although other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, a Central Command Center (CCC), a Network Operations Center (NOC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
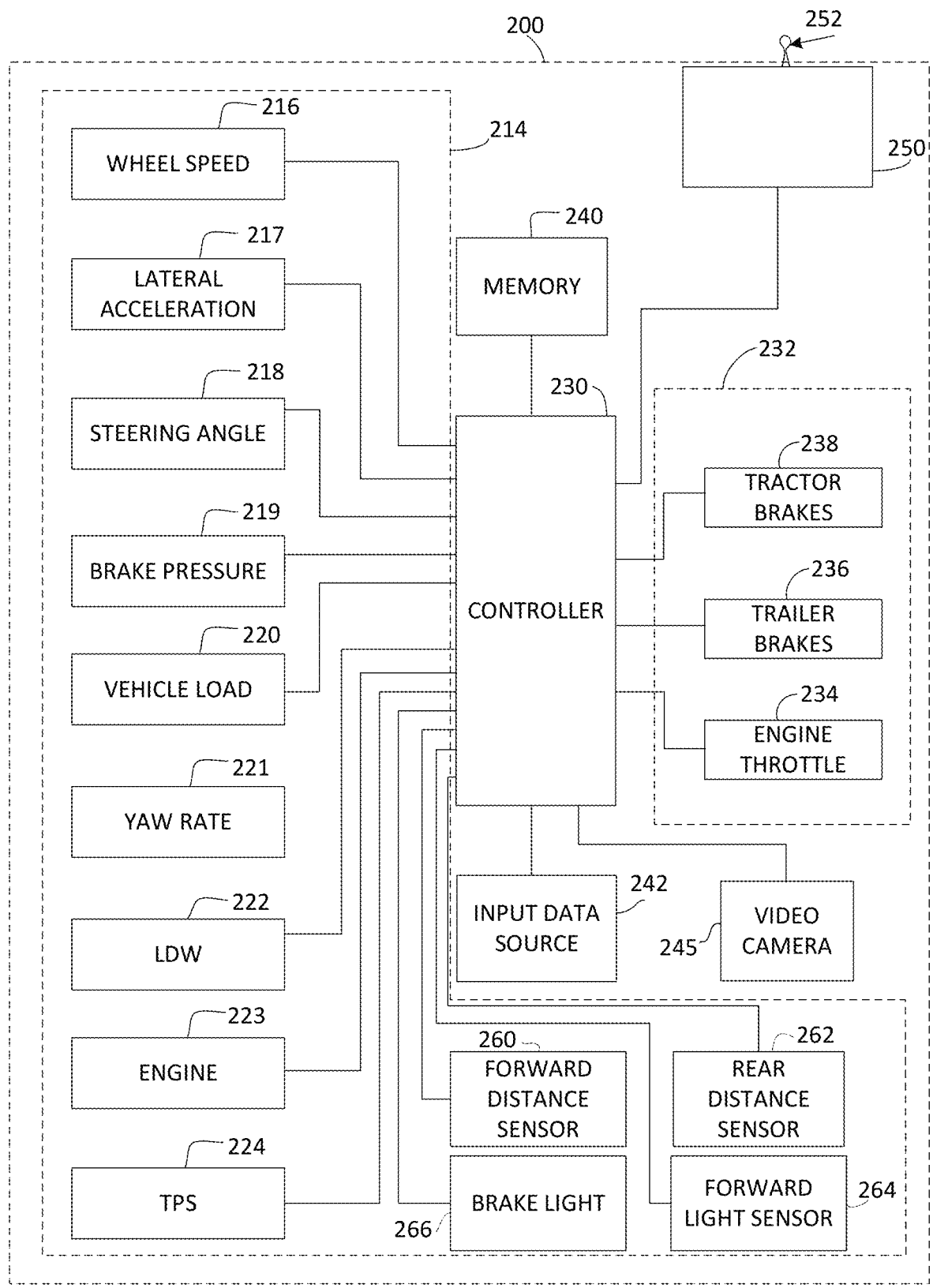
FIG. 2 is a schematic illustration of an exemplary embodiment of a data collection and communication module portion of the subject multi-lane platoon control system according to the example embodiment.

With reference next to FIG. 2, a schematic representation of a data collection and communication module portion 200 of the subject system for rearrangement of vehicles onto non-columnar V-shaped formations according to principles of the example embodiment is illustrated. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, one or more engine condition sensors 223, and a tire pressure monitoring system (TPMS) 224. The data collection and communication module 200 may also utilize additional devices or sensors in the exemplary embodiment including for example a forward distance sensor 260, a rear distance sensor 262, a rear light such as a rear brake light 266, and a forward light sensor 264. Other sensors and/or actuators or energy generation devices or combinations thereof may be used of otherwise provided as well, and one or more devices or sensors may be combined into a single unit as may be necessary and/or desired.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include or otherwise be operatively associated with a memory portion 240 for storing and accessing system information, such as for example the system control logic and control tuning. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The data collection and communication module 200 may also include a source of input data 242 indicative of a configuration/condition of a commercial vehicle. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle such as, for example, one video camera on each corner of the vehicle.

Still yet further, the data collection and communication module 210 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 217 may be combined with the data from the steering angle sensor 218 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
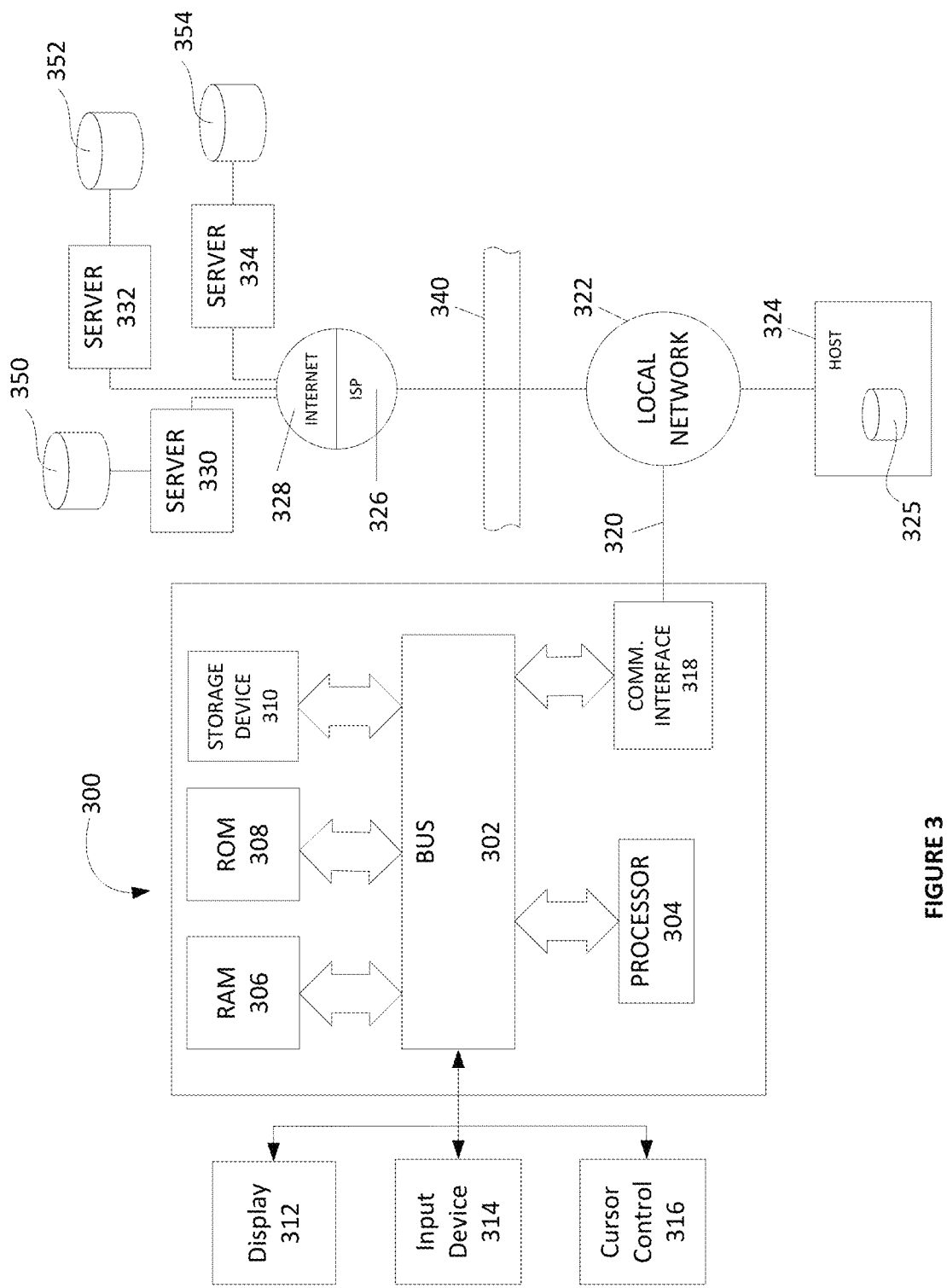
FIG. 3 is a block diagram that illustrates a multi-lane platoon control computer system suitable for executing embodiments of one or more software systems or modules that perform control management and methods of multi-lane platoon management and control according to the example embodiment.

FIG. 3 is a block diagram that illustrates a platoon control computer system 300 suitable for executing embodiments of one or more software systems or modules that perform fleet management and control according to the subject application for determining and using braking capabilities of vehicles for platooning deceleration operations of fleet vehicles in a platoon. The example system includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon rearrangement computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The platoon rearrangement computer system 300 can send messages and receive data, including program code, through the network(s), network link 320 and communication interface 318. In the Internet-connected example embodiment, the platoon rearrangement computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon rearrangement computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although platoon rearrangement computer system 300 is shown in FIG. 3 as being connectable to a set of three (3) servers, 330, 332, and 334, those skilled in the art will recognize that platoon rearrangement computer system 300 may establish connections to multiple additional servers on Internet 328. Each such server in the example embodiments includes HTTP-based Internet applications, which may provide information to platoon rearrangement computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon rearrangement computer system 300 suitably includes several subsystems or modules to perform the platoon control and management as set forth herein. A primary purpose of the subject application is to provide platoon control and management for arranging two or more vehicles cooperatively travelling seriatim as a platoon along an associated roadway into a platoon arrangement, and to control the gap distances therebetween, in accordance with their relative braking capabilities and other brake-related performance characteristics.

Figure 4A:
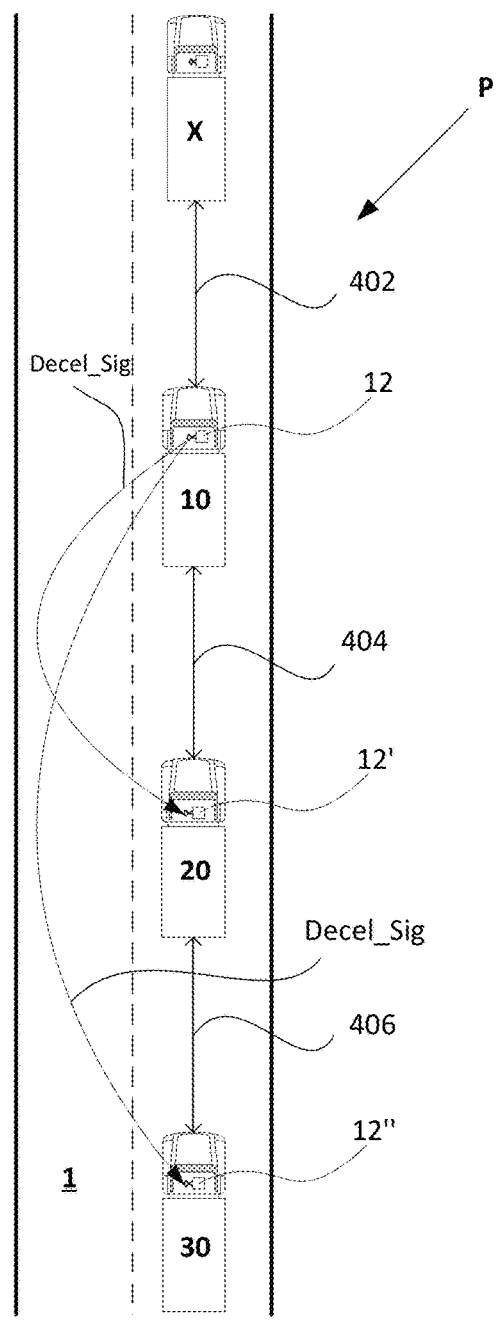
FIG. 4a is a schematic depiction of the platoon slowed by an associated non-platooning vehicle forward of the platoon.

FIG. 4a is a schematic depiction of the platoon slowed by an associated non-platooning vehicle forward of the platoon. In FIG. 4a second and third vehicles 20, 30 follow behind a leader vehicle 10 travelling in a lane on an associated roadway 10 along a forward path (vertically upward in the Figures) in a first forward direction (upward in the Figures) by following or longitudinal gap distances 402, 404, 406, respectively. The following or longitudinal gap distances 402, 404, 406 are parallel to the first forward travelling direction and the path of travel of the platooning vehicles. FIG. 4a illustrates a basic platoon P including a host or leader vehicle 10 in traffic with a non-platooning traffic vehicle X and second or follower vehicles 20, 30 in accordance with the present disclosure. As shown, the follower vehicles 20, 30 are traveling proximate to the leader vehicle 10 seriatim in an ordered platoon P along the roadway 1. The leader vehicle 10 is provided with an electronic control system 12 of the type described above which includes a data collection and communication module portion of the type described above and a platooning control portion also of the type described above. Similarly, the follower vehicles 20, 30 are each also provided with an electronic control system 12', 12" which also include data collection and communication module portions and platooning control portions. In the example embodiments to be described herein, each of the two or more vehicles comprising the various platoons that will be described include the same or equivalent electronic control system 12, the same or equivalent data collection and communication module portion 200, and the same or equivalent platooning control portion 300, although other control systems having the functionality to be described herein may equivalently be used as necessary or desired.

In FIG. 4a, each of the platooning vehicles 10, 20, 30 includes a communication transceiver 250 operatively coupled with the platoon control unit 12, 12', 12". Relative to the following vehicles, 20, 30, the communication transceiver 250 is operable to receive a deceleration command signal Decel_Sig from the associated leading vehicle 10. In the example embodiment, the deceleration command signal Decel_Sig comprises deceleration command data Decel_Data selectively usable by the associated following vehicles 20, 30 to effect a deceleration operation of the associated following vehicles 20, 30. In addition, each of the platooning vehicles 10, 20, 30 includes a vehicle speed sensor and a forward distance sensor operatively coupled with their respective platoon control units 12, 12', and 12". The vehicle speed sensors operate to sense a relative speed between the vehicles and the associated roadway 1, and further operate to generate relative speed data Spd_Data representative of the sensed relative speed between the vehicles and the associated roadway 1. The forward distance sensors operate to sense a relative position between the adjacent vehicles, and to generate relative distance data Dist_10_20 representative of the sensed relative positions between the adjacent vehicles. For example, the forward distance sensor 260 of the leading vehicle 10 senses a relative distance 402 between itself and the non-platooning interloper vehicle X, and generates relative distance data representative thereof. Similarly, the forward distance sensor 260 of the following vehicle 20 senses a relative distance 404 between it and the next forward platooning vehicle 10, and generates relative distance data representative thereof. Also similarly, the forward distance sensor 260 of the following vehicle 30 senses a relative distance 406 between it and the next forward platooning vehicle 20, and generates relative distance data representative thereof.

As noted above, the communication transceiver 250 of the following vehicles, 20, 30 are operable to receive a deceleration command signal Decel_Sig from the associated leading vehicle 10. In the example embodiment, the deceleration command signal Decel_Sig comprises deceleration command data Decel_Data selectively usable by the associated following vehicles 20, 30 to effect a deceleration operation of the associated following vehicles 20, 30. As further noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 4B:
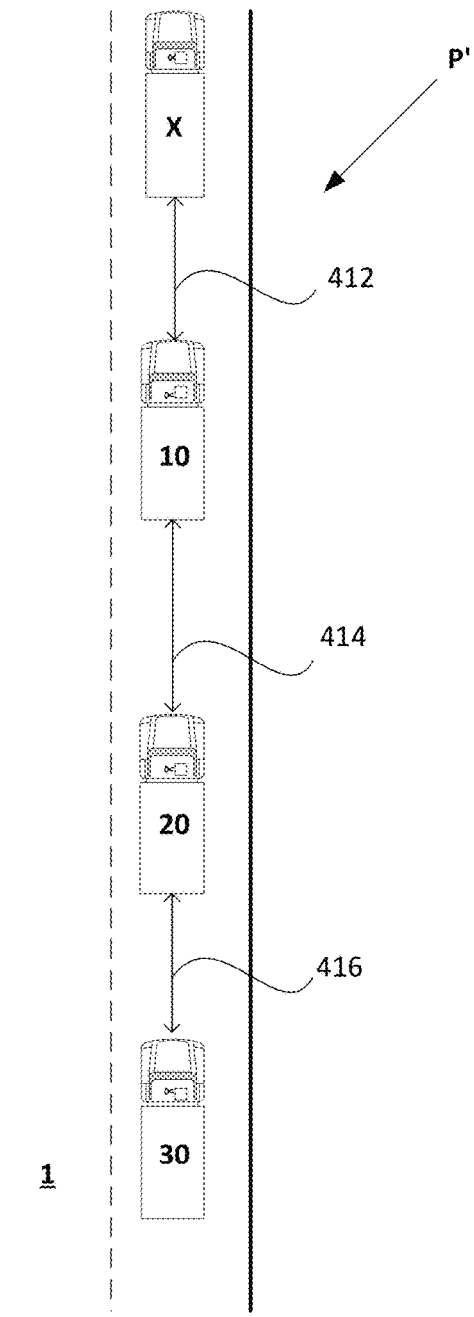
FIG. 4b is a schematic depiction of the platoon of FIG. 4a in a condition following initiation of a deceleration operation.

FIG. 4b is a schematic depiction of the platoon of FIG. 4a in a condition following a deceleration operation responsive to receiving, by the following vehicles 20, 30 the deceleration command signal Decel_Sig from the leading vehicle 10. The deceleration command signal Decel_Sig comprises deceleration command data Decel_Data selectively usable by the following vehicles 20, 30 to effect a deceleration operation. As shown, owing to changes in braking efficiency as may be affected by many factors such as brake temperature, brake type, burnishing, vehicle weight, number of tires, tire wear, vehicle loading, road surface type and weather conditions, the following or longitudinal gap distances 402, 404, 406 parallel to the first forward travelling direction and between the platooning vehicles of FIG. 4a prior to deceleration operation are not maintained in FIG. 4b following initiation of the deceleration operation responsive to the deceleration command signal Decel_Sig being generated from the leading vehicle 10 and received at the following vehicles 20, 30. More particularly, in FIG. 4b, the forward distance sensor 260 of the leading vehicle 10 senses a relative distance 412 between itself and the non-platooning interloper vehicle X, and generates relative distance data representative thereof. Similarly, the forward distance sensor 260 of the following vehicle 20 senses a relative distance 414 between it and the next forward platooning vehicle 10, and generates relative distance data representative thereof. Also similarly, the forward distance sensor 260 of the following vehicle 30 senses a relative distance 416 between it and the next forward platooning vehicle 20, and generates relative distance data representative thereof.

In FIG. 4b, the logic of the platoon control units of each of the vehicles 10, 20, 30 are executable by the processors thereof to generate first quantitative error rate data Error_Rate_Data in accordance with a predetermined combination of the relative speed data Spd_Data obtained from the vehicle speed sensors, the relative distance data 412, 414, 416 obtained from the forward distance sensors 260, and the received and/or generated deceleration command data Decel_Data. In the example embodiment, the first quantitative error rate data Error_Rate_Data is representative of a difference between a commanded gap distance 402, 404, 406 to be maintained between the following and leading vehicles 20, 10 (FIG. 4a) and the relative distance between the following and leading vehicles sensed by the forward distance sensors 260 (FIG. 4b). The platoon control units of each of the vehicles 10, 20, 30 are executable by the processors thereof to selectively combine the first quantitative error rate data Error_Rate_Data with an average quantitative error rate data value stored in the non-transient memory device to generate an updated quantitative error rate data value, and to store the updated quantitative error rate data value in the non-transient memory device.

Figure 4C:
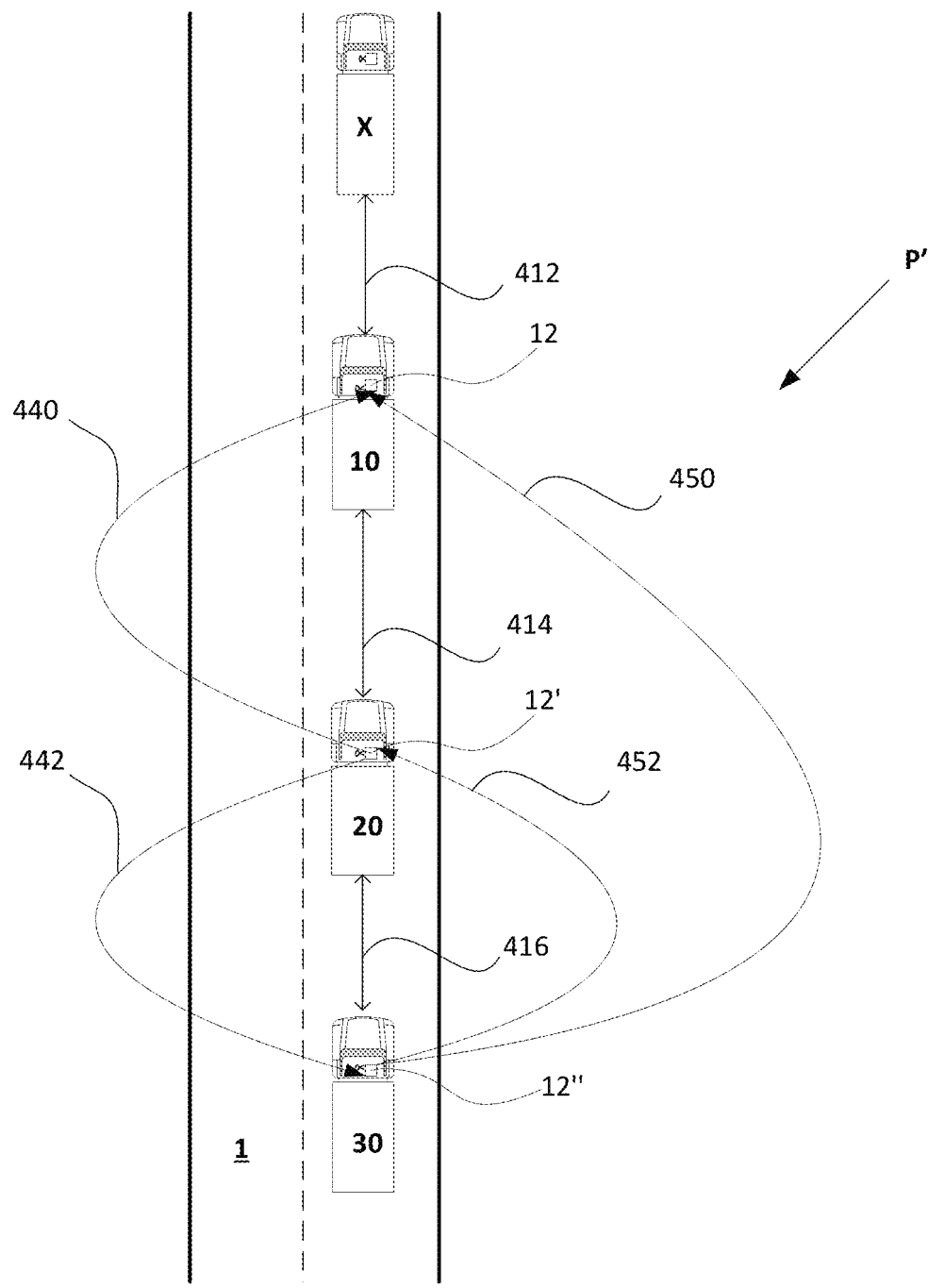
FIG. 4c is a schematic depiction of the platoon of FIGS. 4a and 4b illustrating communication of quantitative error rate data between the platooning vehicles in accordance with an embodiment.

FIG. 4c is a schematic depiction of the platoon of FIGS. 4a and 4b illustrating communication of quantitative error rate data between the platooning vehicles in accordance with an embodiment. With reference now to that Figure, the vehicles 10, 20, 30 each include a communication transmitter operatively coupled with the platoon control unit. The communication transmitter is operated in the example embodiment to convert the first quantitative error rate data Error_Rate_Data into a first quantitative error rate data signal Error_Rate_Data_Sig, and to transmit the first quantitative error rate data signal Error_Rate_Data_Sig from the following vehicles 20, 30 to the associated leading vehicle 10 and to the one or more other associated following vehicles. For example, the communication transmitter of the first following vehicle 20 is operated in the example embodiment to convert the first quantitative error rate data Error_Rate_Data into a first quantitative error rate data signal Error_Rate_Data_Sig, and to transmit the first quantitative error rate data signals 440, 442 respectively from the following vehicle 20 to the leading vehicle 10 and to the other associated following vehicle 30. Similarly, the communication transmitter of the second following vehicle 30 is operated in the example embodiment to convert the first quantitative error rate data Error_Rate_Data into a first quantitative error rate data signal Error_Rate_Data_Sig, and to transmit the first quantitative error rate data signals 450, 452 respectively from the following vehicle 30 to the leading vehicle 10 and to the other associated following vehicle 20. In this way, each vehicle of the platooning vehicles 10, 20, 30 can learn and compare and otherwise process the first quantitative error rate data determined by all of the other vehicles participating in the platoon P.

In a further example embodiment, each vehicle of the platooning vehicles 10, 20, 30 can learn and compare and otherwise process the quantitative error rate data determined by all of the other vehicles participating in the platoon P including for example one or more vehicles ahead of or leading the next forward vehicle as well as one or more vehicles behind or following the next rearward vehicle. In this regard, the communication transceiver 250 in the following vehicle 30 is operated for example to receive a forward quantitative error rate signal from the leading vehicle 10 forward in the platoon of the next ahead vehicle 20. The forward quantitative error rate signal comprises forward quantitative error rate data representative of a difference between a commanded gap distance 402 to be maintained between the leading vehicle 10 and a further associated vehicle X forward in the platoon of the associated vehicle 10 forward of the following vehicle 20. Further in this regard then, the communication transceiver 250 in the leading vehicle 10 is operated for example to receive a forward quantitative error rate signal from the following vehicle 30 rearward in the platoon of the next behind vehicle 20. The forward quantitative error rate signal comprises forward quantitative error rate data representative of a difference between a commanded gap distance 406 to be maintained between the third following vehicle 30 and the second following vehicle 20 next rearward in the platoon relative to the leading vehicle 10.

As noted above and with reference next to FIGS. 5a-5c, in order to optimize the safety of non-platooning vehicles sharing a roadway with a platoon of vehicles, the platooning vehicles should be ordered so the vehicle that are capable of the highest deceleration are to the front to protect the public and the lightest braking vehicles are to the back. This also gives the rear vehicle more time gap for braking.

In accordance with an example embodiment, each platoon vehicle calculates or otherwise determines its own braking capability, and determines the relative braking capability of each of the other vehicles of the platoon such as for example by sharing braking capability information including for example quantitative error rate data determined locally at each vehicle. Then, the determined relative braking capability is used as one factor of platoon order determination.

Figure 5A:
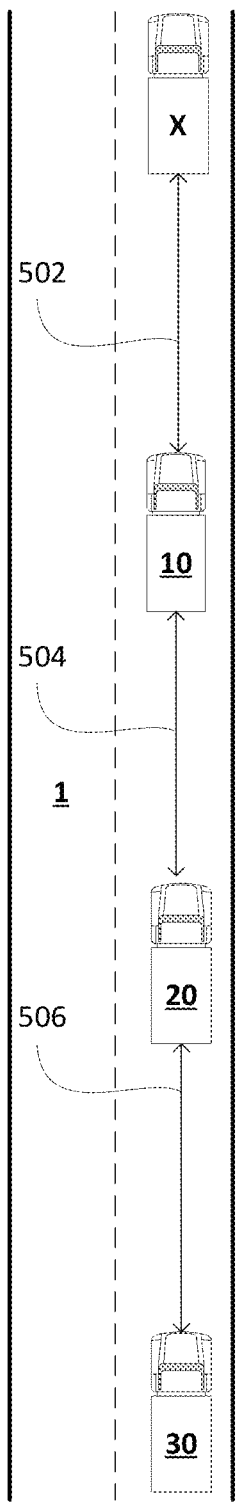
FIG. 5a is a schematic depiction of the platoon slowed by an associated non-platooning vehicle forward of the platoon and prior to an initiation of a platoon deceleration operation in accordance with an example embodiment.

FIG. 5a is a schematic depiction of the platoon slowed by an associated non-platooning vehicle forward of the platoon and prior to an initiation of an inter-vehicle gap adjustment platoon control in accordance with an example embodiment. Overall, in the example embodiment, opportunistic braking is used to compute an error rate while following a non-platoon vehicle X. When a forward vehicle X slows down, the lead vehicle 10 computes the desired deceleration needed to maintain a safe gap 502 and sends the deceleration request to all the vehicles behind 20, 30. Each vehicle 10, 20, 30 shall attempt to brake at the transmitted rate to maintain their desired following distance 502, 504, 506.

Figure 5B:
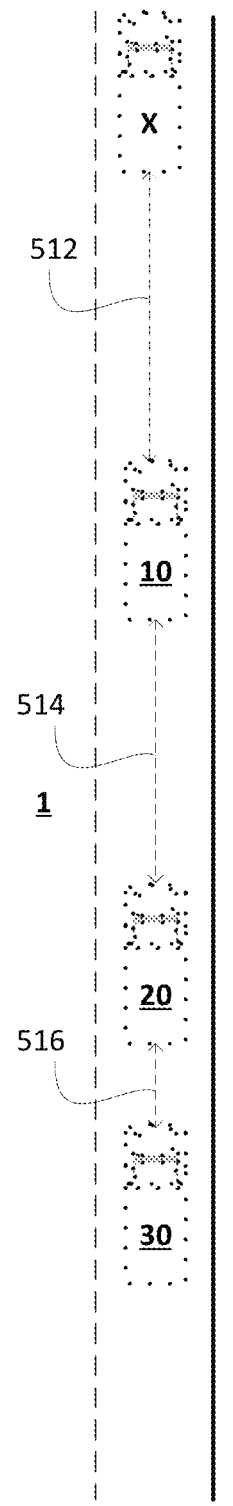
FIG. 5b is a schematic depiction of the platoon of FIG. 5a in a condition following initiation of the platoon deceleration operation and without implementing the inter-vehicle gap adjustment platoon control of the example embodiment.

However, because of inefficiencies in braking, the demand may not be met fully on each vehicle. For example, as shown in FIG. 5b, the leading vehicle having the best or highest deceleration capabilities is able to maintain its desired following distance 502 from the condition prior to initiating the platoon deceleration operation through to the condition after performing the platoon deceleration operation at 512. Also in the example and as shown in FIG. 5b, the first following vehicle 20 having good deceleration capabilities is able to maintain its desired following distance 504 from the condition prior to initiating the platoon deceleration operation through to the condition after performing the platoon deceleration operation at 514. However, the second following vehicle 30 having poor deceleration capabilities is unable to maintain its desired following distance 506 from the condition prior to initiating the platoon deceleration operation through to the condition after performing the platoon deceleration operation at 516. In the example, the second following vehicle 30 experienced a shortfall distance 550 from the desired following distance 506 as illustrated.

In accordance with an embodiment, if a non-lead platoon vehicle determines that the braking force available will not be possible using the available gap, an over-the-air message is transmitted to the forward platoon vehicles to reduce their gap to a minimum giving the non-conforming following vehicle additional gap distance for its braking operation. This helps to eliminate or otherwise mitigate damage caused by inter-platoon-vehicle collisions. In the example shown in FIG. 5c, the leading vehicle 10 "donates" an adjusted gap distance 560 from its desired following distance 502 yielding a modified following gap distance 522. Similarly in the example shown in FIG. 5c, the first following vehicle 20 "donates" an adjusted gap distance 562 from its desired following distance 504 yielding a modified following gap distance 524. The second following vehicle 30 then has added following distance within to perform the deceleration operation in an amount of the gap distances 560, 562 contributed by the modified gap distances 522, 524 of the leading and first following vehicles.

Figure 5C:
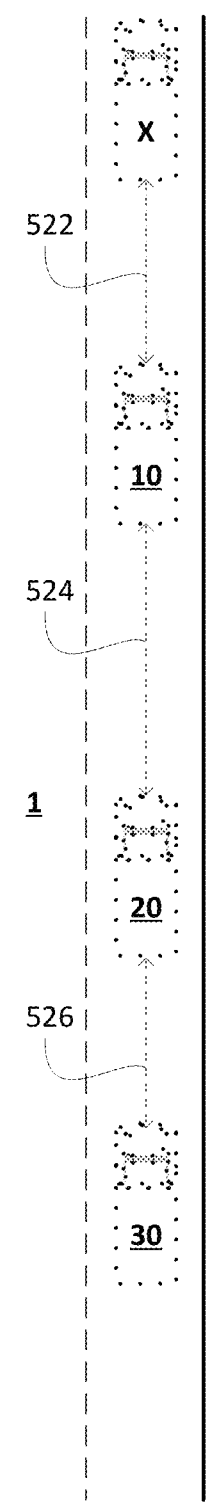
FIG. 5c is a schematic depiction of the platoon of FIG. 5a in a condition following initiation of the platoon deceleration operation and with implementing the inter-vehicle gap adjustment platoon control of the example embodiment.

In the example embodiment show in FIGS. 5a-5c, the communication transceiver 250 of the control systems 12, 12', 12" of the vehicles are each operable to receive a commanded gap signal comprising commanded gap data representative of the commanded gap distance to be maintained between the following 20, 30 and leading 10 vehicles. The desired commanded gap distances to be maintained between the following 20, 30 and leading 10 vehicles are shown at 502, 504, and 506 in the Figures. The logic of the control systems 12, 12', 12" of the vehicles is executable by the processor to determine a distance between the commanded gap distance and the relative position between the following and leading vehicles sensed by their respective forward distance sensors 260. The logic is further operable to selectively generate gap exceeded data Gap_Ex_Data representative of a value of the difference relative to a predetermined a gap limit value stored in the non-transient memory device.

In addition in this example embodiment, the control systems 12, 12', 12" of the vehicles further include a communication transmitter operatively coupled with the platoon control unit. The communication transmitters are operable to convert the gap extended data Gap_Ex_Data into a gap extended signal Gap_Ex_Sig, and transmit the gap extended signal from one or more of the associated following vehicles to the set of platooning vehicles comprising the associated leading vehicle 10 and the other vehicles of the platoon. In the example embodiment, the gap exceeded data is selectively usable by the associated other vehicles to adjust a commanded inter-vehicle gap distance to be maintained between pairs of the platooning vehicles.

Figure 6:
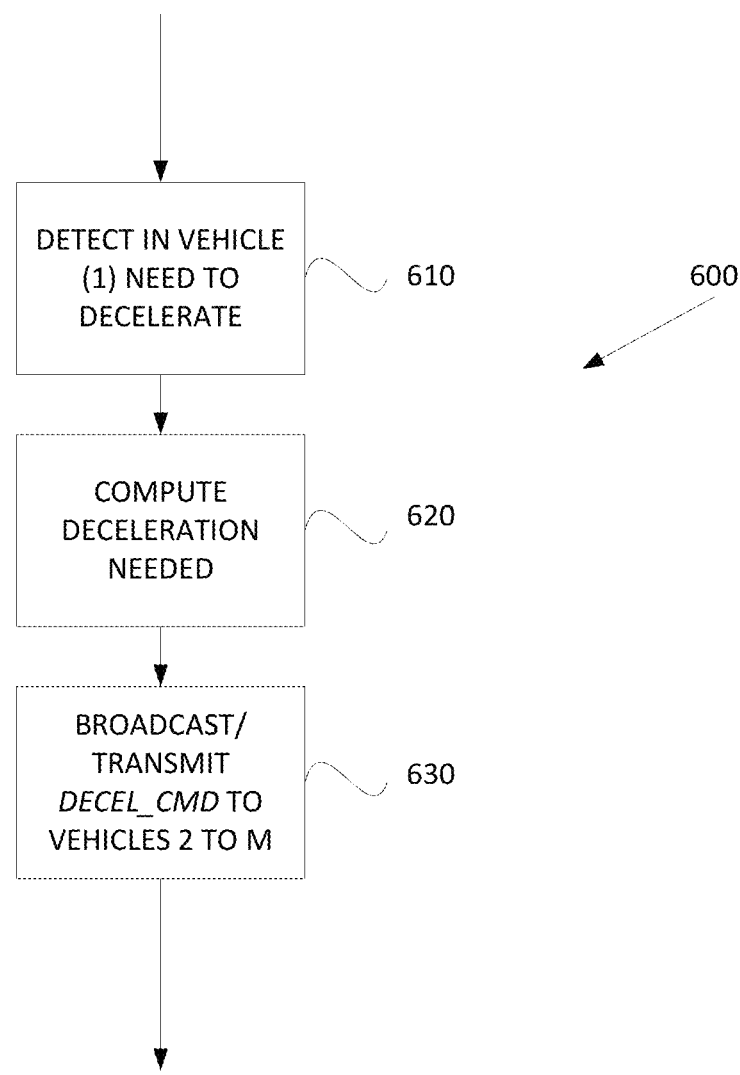
FIG. 6 is a flow diagram showing a method in a platoon leading vehicle of determining and broadcasting a deceleration command to the other vehicles of the platoon.

FIG. 6 is a flow diagram showing a method 600 in a platoon leading vehicle of determining and broadcasting a deceleration command to the other vehicles of the platoon. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, determining and using braking capabilities of vehicles for platooning deceleration operations of fleet vehicles in a platoon. Although the portions of the methods described herein are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In the method 600 of determining and broadcasting by the leading vehicle a deceleration command to the other vehicles of the platoon, the platoon of the example embodiment has M vehicles where M is three (3) or more. The leading vehicle 1 (of the 1 to M vehicles) in step 610 detects a need to decelerate. The detection of the need to decelerate might occur, for example, when an interloper non-platooning vehicle X enters into the path of the platoon such as shown in FIG. 4a for example.

In step 620 the leading vehicle 1 computed the deceleration need for the platoon to avoid collision with the interloper vehicle X, and a deceleration command Decel_Cmd is broadcast by the leading vehicle 1 to the other platooning vehicles 2-M.

In one example, executable instructions associated with performing a method may be embodied as logic encoded in one or more tangible media for execution. When executed, the instructions may perform a method. Thus, in one example, logic encoded in one or more tangible media may store computer executable instructions that if executed by a machine (e.g., processor) cause the machine to perform method 1000. While executable instructions associated with the above method are described as being embodied as a logic encoded in one or more tangible media, it is to be appreciated that executable instructions associated with other example methods described herein may also be stored on a tangible media.

Figure 7:
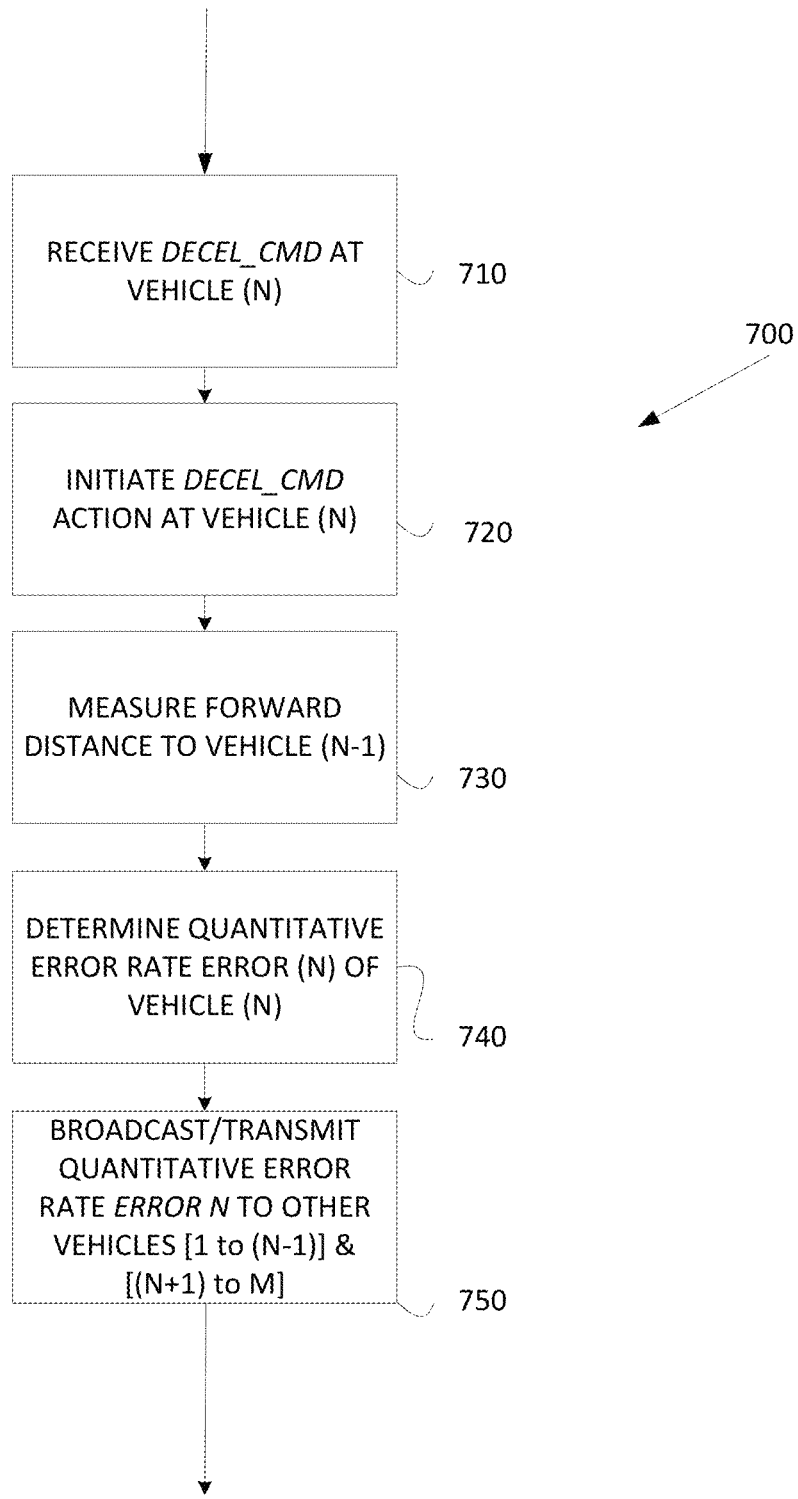
FIG. 7 is a flow diagram showing a method in a platoon following vehicle of receiving the deceleration command of FIG. 6 and broadcasting a quantitative error rate from the platoon following vehicle to the other vehicles of the platoon.

FIG. 7 is a flow diagram showing a method 700 in a platoon following vehicle of receiving the deceleration command of FIG. 6 and broadcasting a quantitative error rate from the platoon following vehicle to the other vehicles of the platoon. In step 710 a platooning vehicle N of the set of platooning vehicles 1-M receives the deceleration command Decel_Cmd broadcast by the leading vehicle 1 to the other platooning vehicles 2-M. At step 720, the platooning vehicle N receiving the deceleration command Decel_Cmd (all platooning vehicles 2-M receive the deceleration command Decel_Cmd) initiates a deceleration operation in accordance with deceleration command data Decel_Cmd_Data contained in the deceleration command Decel_Cmd.

In step 730 the platooning vehicle N measures the distance to the next forward platooning vehicle N−1 and determines, at step 740 a quantitative error rate of the vehicle N relative to the desired inter-vehicle gap distance to be maintained.

The quantitative error rate of the vehicle N relative to the desired inter-vehicle gap distance to be maintained determined at step 740 is broadcast in step 750 from the platoon vehicle N to the other vehicles including platoon vehicles 1 to (N−1) and platoon vehicles (N+1) to M.

In accordance with the example embodiment shown in FIG. 7 and with reference also to FIGS. 4a-4c and 5a-5c, a method 700 is provided for determining a relative braking capability of a following vehicle 20 of a set of platooning vehicles comprising a leading vehicle 10 and one or more following vehicles 30, 40 cooperatively travelling seriatim as a platoon (P) along an associated roadway. In the method, a platoon control unit is provided in the following vehicle. The platoon control unit includes in the example embodiment a processor, a non-transient memory device operatively coupled with the processor, and logic stored in the non-transient memory and executable by the processor to selectively reorganize the platooning vehicles The method 700 of the example embodiment includes receiving, by a communication transceiver 250 operatively coupled with the platoon control unit, a deceleration command signal Decel_Sig from the leading vehicle 10. The deceleration command signal Decel_Sig includes deceleration command data Decel_Data selectively usable by the following vehicle 20 to effect a deceleration operation of the following vehicle 20.

The method 700 of the example embodiment further includes sensing a relative speed between the following vehicle 20 and the associated roadway by a vehicle speed sensor operatively coupled with the platoon control unit and being configured to be disposed in the following vehicle 20.

The method 700 of the example embodiment further includes generating, by the vehicle speed sensor relative speed data Spd_Data representative of the sensed relative speed between the following vehicle 20 and the associated roadway (1);

The method 700 of the example embodiment further includes sensing, by a forward distance sensor 260 operatively coupled with the platoon control unit and being configured to be disposed in the following vehicle 20, a relative position between the following vehicle 20 and the leading vehicle 10.

The method 700 of the example embodiment further includes generating, by the forward distance sensor 260, relative distance data Dist_10_20 representative of the sensed relative position between the following vehicle 20 and the leading vehicle 10.

The method 700 of the example embodiment further includes executing the logic of the platoon control unit by the processor to generate first quantitative error rate data Error_Rate_Data in accordance with a predetermined combination of the relative speed data Spd_Data, the relative distance data Dist_10_20, and the deceleration command data Decel_Data, the first quantitative error rate data Error_Rate_Data being representative of a difference between a commanded gap distance to be maintained between the following and leading vehicles 20, 10 and the relative distance between the following and leading vehicles sensed by the forward distance sensor 260.

The method 700 of the example embodiment further includes executing the logic of the platoon control unit by the processor to store the first quantitative error rate data Error_Rate_Data in the non-transient memory device.

The method 700 of the example embodiment further includes executing the logic of the platoon control unit by the processor to combine the first quantitative error rate data Error_Rate_Data with an average quantitative error rate data value stored in the non-transient memory device to generate an updated quantitative error rate data value, and store the updated quantitative error rate data value in the non-transient memory device.

The method 700 of the example embodiment further includes converting, by a communication transmitter operatively coupled with the platoon control unit, the updated quantitative error rate data value into an updated quantitative error rate data signal Error_Rate_Data_Sig, and transmitting, by the communication transmitter, the updated quantitative error rate data signal Error_Rate_Data_Sig from the following vehicle 20 to the leading vehicle 10 and to the one or more following vehicles 30, 40, 50, etc.

The method 700 of the example embodiment further includes converting, by a communication transmitter operatively coupled with the platoon control unit, the first quantitative error rate data Error_Rate_Data into a first quantitative error rate data signal Error_Rate_Data_Sig, and transmitting, by the communication transmitter, the first quantitative error rate data signal Error_Rate_Data_Sig from the following vehicle 20 to the leading vehicle 10 and to the one or more following vehicles 30, 40, 50, etc.

Figure 8:
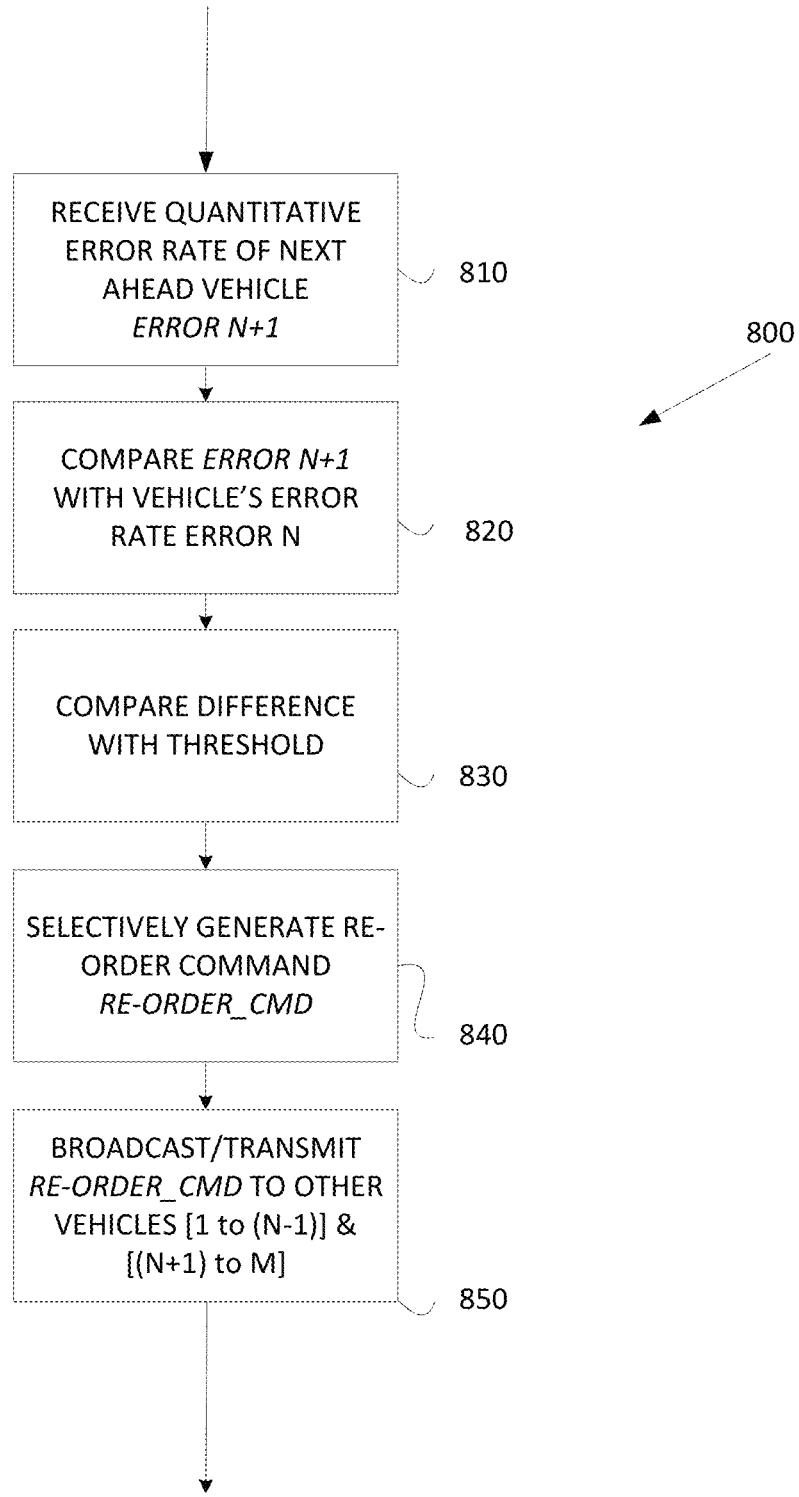
FIG. 8 is a flow diagram showing a method in a platoon following vehicle of receiving the quantitative error rate from a next ahead vehicle of the platoon and selectively broadcasting a platoon re-order command to the other vehicles of the platoon.

FIG. 8 is a flow diagram showing a method 800 in a platoon following vehicle of receiving the quantitative error rate from a next ahead vehicle of the platoon and selectively broadcasting a platoon re-order command to the other vehicles of the platoon. With reference now to that Figure, the quantitative error rate is received in step 810 by the following vehicle N from the next ahead platooning vehicle N+1. Then, at step 820 the following vehicle N compares the quantitative error rate is received in step 810 from the next ahead platooning vehicle N+1 with the following vehicle's own quantitative error rate. The difference is tested in step 830 against a threshold value stored in the non-transient memory device of the vehicle's control computer 12. A platoon re-order command Re_Order_Cmd is selectively generated by the following vehicle N at step 840 in accordance with a result of the comparison. The re-order command Re_Order_Cmd is broadcast in step 850 from the platoon vehicle N to the other vehicles including platoon vehicles 1 to (N−1) and platoon vehicles (N+1) to M.

In accordance with the example embodiment shown in FIG. 8, the method 800 includes receiving, by the communication transceiver 250, a forward quantitative error rate signal from a vehicle forward in the platoon of the following vehicle 20, the forward quantitative error rate signal comprising forward quantitative error rate data representative of a difference between a commanded gap distance to be maintained between the vehicle forward in the platoon of the following vehicle 20 and a further vehicle forward in the platoon of the vehicle forward of the following vehicle 20.

The method 800 further includes executing the logic of the platoon control unit by the processor to determine a difference between the forward quantitative error rate data and a predetermined threshold forward gap value stored in the non-transient memory device, and executing the logic of the platoon control unit by the processor to selectively generate, responsive to a magnitude of the difference, a re-order command signal comprising re-order command data, the re-order command data being selectively usable by the set of platooning vehicles for re-ordering the platoon in accordance with the re-order command data.

Figure 9:
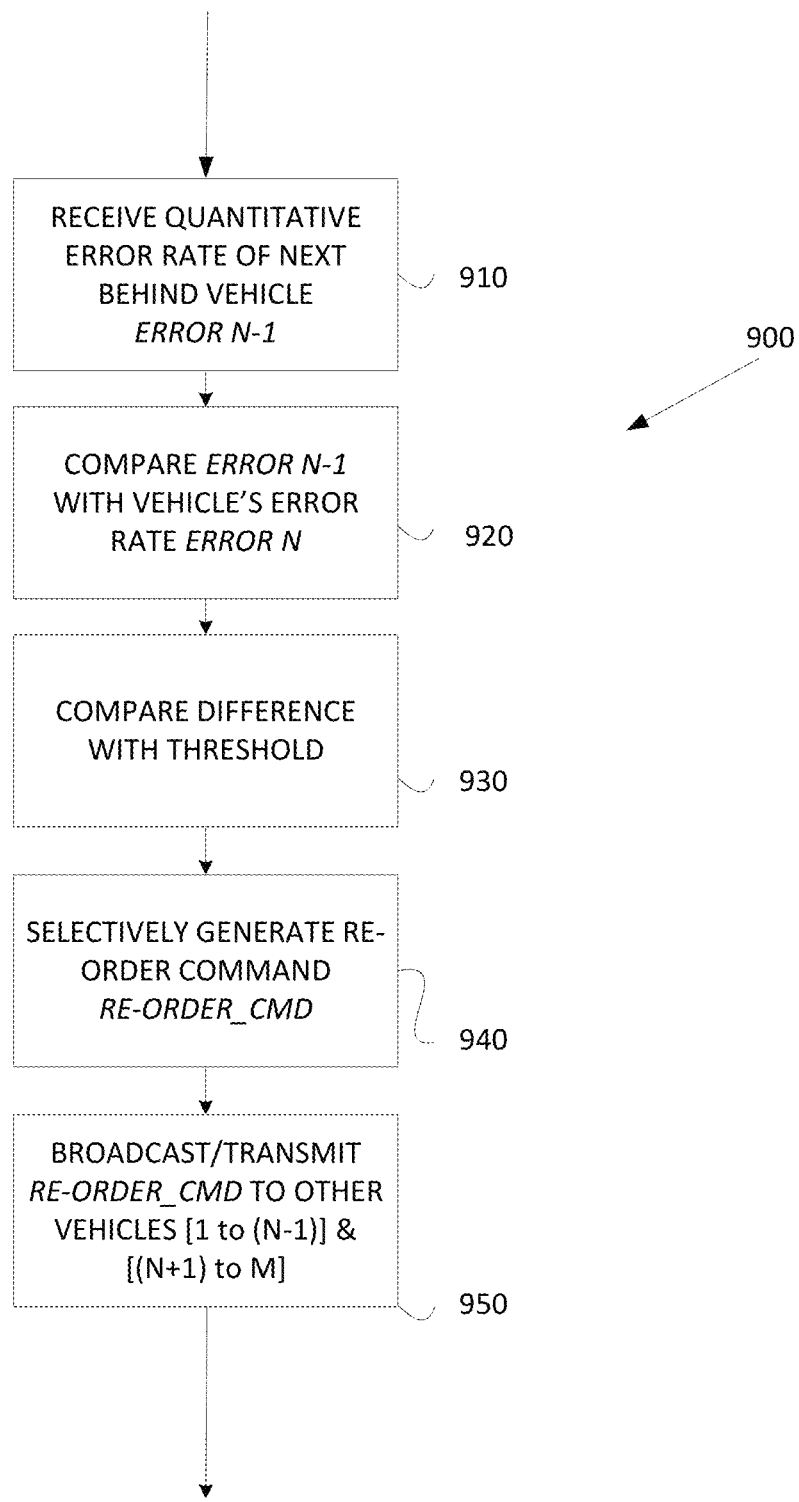
FIG. 9 is a flow diagram showing a method in a platoon following vehicle of receiving the quantitative error rate from a next behind vehicle of the platoon and selectively broadcasting a platoon re-order command to the other vehicles of the platoon.

FIG. 9 is a flow diagram showing a method 900 in a platoon following vehicle of receiving the quantitative error rate from a next behind vehicle of the platoon and selectively broadcasting a platoon re-order command to the other vehicles of the platoon. With reference now to that Figure, the quantitative error rate is received in step 910 by the following vehicle N from the next behind platooning vehicle N−1. Then, at step 920 the following vehicle N compares the quantitative error rate is received in step 910 from the next behind platooning vehicle N−1 with the following vehicle's own quantitative error rate. The difference is tested in step 930 against a threshold value stored in the non-transient memory device of the vehicle's control computer 12. The platoon re-order command Re_Order_Cmd is selectively generated by the following vehicle N at step 940 in accordance with a result of the comparison. The re-order command Re_Order_Cmd is broadcast in step 950 from the platoon vehicle N to the other vehicles including platoon vehicles 1 to (N−1) and platoon vehicles (N+1) to M.

In accordance with the example embodiment shown in FIG. 9, the method 900 further includes receiving, by the communication transceiver 250, a rearward quantitative error rate signal from a vehicle 30 rearward in the platoon P of the following vehicle 20, the rearward quantitative error rate signal comprising forward quantitative error rate data representative of a difference between a commanded gap distance to be maintained between the vehicle 30 rearward in the platoon of the following vehicle 20 and a further vehicle rearward in the platoon of the vehicle rearward of the following vehicle 20.

The method of the example embodiment further includes executing the logic of the platoon control unit by the processor to determine a difference between the rearward quantitative error rate data and a predetermined threshold forward gap value stored in the non-transient memory device, and executing the logic of the platoon control unit by the processor to selectively generate, responsive to a magnitude of the difference, a re-order command signal comprising re-order command data. The re-order command data is selectively usable by the set of platooning vehicles for re-ordering the platoon in accordance with the re-order command data.

Figure 10:
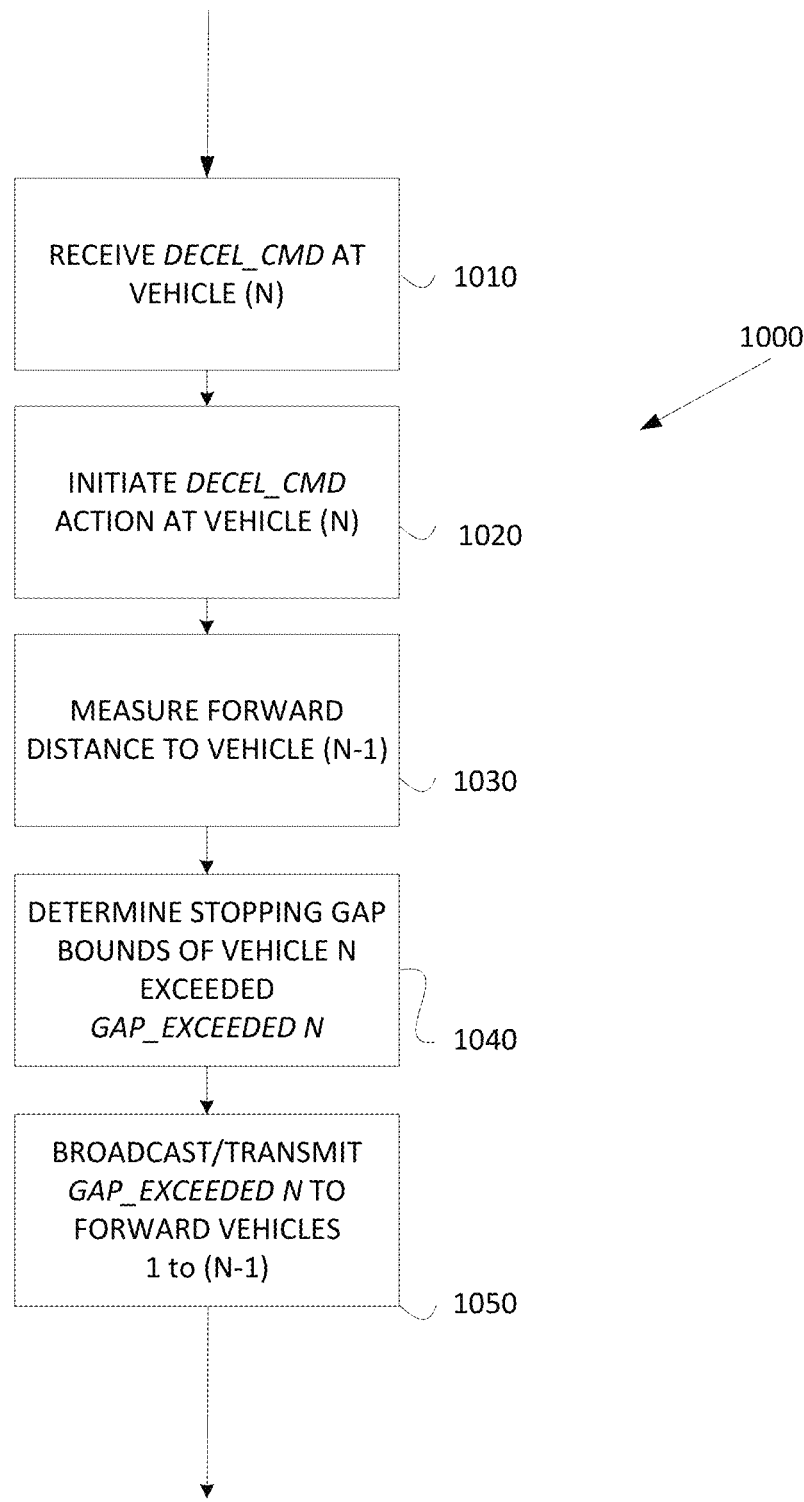
FIG. 10 is a flow diagram showing a method in a platoon following vehicle of receiving the deceleration command of FIG. 6 and broadcasting an inter-vehicle gap adjustment request from the platoon following vehicle to the other vehicles of the platoon.

FIG. 10 is a flow diagram showing a method 1000 in a platoon following vehicle N of a set of platooning vehicles 1-M of receiving the deceleration command of FIG. 6 and broadcasting an inter-vehicle gap adjustment request from the platoon following vehicle N to the other vehicles 1 to (N−1) and (N+1) to M of the platoon. Turning now to that Figure, the following vehicle N receives at step 1010 a deceleration command Decel_CMD from the leading vehicle 1 of the set of 1-M platooning vehicles in the example.

Responsive to receiving the deceleration command Decel_CMD from the leading vehicle 1 of the set of 1-M platooning vehicles, the following vehicle N initiates at step 1020 a deceleration operation and, at step 1030 measures a forward distance to the next forward vehicle N+1 of the set of platooning vehicles 1-M using a forward distance sensor 260 disposed on the following vehicle N.

The control 12 of the following vehicle determines at step 1040 whether the stopping gap bounds of the vehicle are exceeded. The being exceeded is broadcast to the other vehicles at step 1050 so that gap adjustments can be made as necessary or desired by the leading vehicles such as described above in connection with FIGS. 5a-5c.

In accordance with the example embodiment shown in FIG. 10, the method 1000 includes receiving, by the communication transceiver 250, a commanded gap signal comprising commanded gap data representative of the commanded gap distance to be maintained between the following and leading vehicles 20, 10, executing the logic by the processor to determine a distance between the commanded gap distance and the relative position between the following and leading vehicles 20, 10 sensed by the forward distance sensor 260, and executing the logic by the processor to selectively generate gap exceeded data Gap_Ex_Data representative of a value of the difference relative to a predetermined a gap limit value stored in the non-transient memory device.

In accordance with the example embodiment shown in FIG. 10, the method 1000 includes converting, by a communication transmitter operatively coupled with the platoon control unit, the gap extended data Gap_Ex_Data into a gap extended signal Gap_Ex_Sig, and transmitting, by the communication transmitter, the gap extended signal from the following vehicle 20 to the set of platooning vehicles comprising the leading vehicle 10, the gap exceeded data being selectively usable by the leading vehicle 10 to adjust a commanded gap distance to be maintained between the leading vehicle 10 and an associated non-platooning vehicle forward of the platoon on the associated roadway.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for determining a relative braking capability between an associated following vehicle and one or more vehicles of a set of platooning vehicles comprising an associated leading vehicle and one or more associated following vehicles cooperatively travelling as a platoon along an associated roadway, the system comprising:
   a platoon control unit configured to be disposed in the associated following vehicle, the platoon control unit comprising:
      a processor;
      a non-transient memory device operatively coupled with the processor; and
      logic stored in the non-transient memory and executable by the processor to determine the relative braking capability;
   a communication receiver operatively coupled with the platoon control unit, the communication receiver being operable to:
      receive a deceleration command signal from the associated leading vehicle, the deceleration command signal comprising deceleration command data selectively usable by the associated following vehicle to effect a deceleration operation of the associated following vehicle;
   a vehicle speed sensor operatively coupled with the platoon control unit and configured to be disposed in the associated following vehicle, the vehicle speed sensor being operable to:
      sense a speed of the associated following vehicle during the deceleration operation effected by the associated following vehicle; and
      generate speed data representative of the sensed speed of the associated following vehicle; and
   a forward distance sensor operatively coupled with the platoon control unit and configured to be disposed in the associated following vehicle, the forward distance sensor being operable to:
      sense a relative distance between the associated following vehicle and the associated leading during the deceleration operation effected by the associated following vehicle; and
      generate relative distance data representative of the sensed relative distance between the associated following vehicle and the associated leading vehicle,
   wherein the logic of the platoon control unit is executable by the processor to generate first quantitative error rate data in accordance with a predetermined combination of the relative speed data, the relative distance data, and the deceleration command data, the first quantitative error rate data being representative of a braking capability of the associated following vehicle resulting in a difference between a commanded gap distance to be maintained between the following and leading vehicles and the relative distance between the following and leading vehicles sensed by the forward distance sensor,
   wherein the logic of the platoon control unit is executable by the processor to store the first quantitative error rate data in the non-transient memory device.

2. The system according to claim 1, wherein the logic of the platoon control unit is executable by the processor to:
   combine the first quantitative error rate data with an average quantitative error rate data value stored in the non-transient memory device to generate an updated quantitative error rate data value; and
   store the updated quantitative error rate data value in the non-transient memory device.

3. The system according to claim 2, further comprising:
   a communication transmitter operatively coupled with the platoon control unit, the communication transmitter being operable to:
      convert the updated quantitative error rate data value into an updated quantitative error rate data signal; and
      transmit the updated quantitative error rate data signal from the associated following vehicle to the associated leading vehicle and to the one or more associated following vehicles.

4. The system according to claim 1, further comprising:
   a communication transmitter operatively coupled with the platoon control unit, the communication transmitter being operable to:
      convert the first quantitative error rate data into a first quantitative error rate data signal; and
      transmit the first quantitative error rate data signal from the associated following vehicle to the associated leading vehicle and to the one or more associated following vehicles.

5. The system according to claim 4, wherein:
   the communication receiver is operable to:
      receive a forward quantitative error rate signal from an associated vehicle forward in the platoon of the associated following vehicle, the forward quantitative error rate signal comprising forward quantitative error rate data representative of a difference between a commanded gap distance to be maintained between the vehicle forward in the platoon of the associated following vehicle and a further associated vehicle forward in the platoon of the associated vehicle forward of the following vehicle.

6. The system according to claim 5, wherein:
the logic of the platoon control unit is executable by the processor to determine a difference between the forward quantitative error rate data and a predetermined threshold forward gap value stored in the non-transient memory device; and
the logic of the platoon control unit is executable by the processor to selectively generate, responsive to a magnitude of the difference, a re-order command signal comprising re-order command data, the re-order command data being selectively usable by the set of platooning vehicles for re-ordering the platoon in accordance with the re-order command data.

7. The system according to claim 4, wherein:
the communication receiver is operable to:
receive a rearward quantitative error rate signal from an associated vehicle rearward in the platoon of the associated following vehicle, the rearward quantitative error rate signal comprising forward quantitative error rate data representative of a difference between a commanded gap distance to be maintained between the vehicle rearward in the platoon of the associated following vehicle and a further associated vehicle rearward in the platoon of the associated vehicle rearward of the following vehicle.

8. The system according to claim 7, wherein:
the logic of the platoon control unit is executable by the processor to determine a difference between the rearward quantitative error rate data and a predetermined threshold forward gap value stored in the non-transient memory device; and
the logic of the platoon control unit is executable by the processor to selectively generate, responsive to a magnitude of the difference, a re-order command signal comprising re-order command data, the re-order command data being selectively usable by the set of platooning vehicles for re-ordering the platoon in accordance with the re-order command data.

9. The system according to claim 1, wherein:
the communication receiver is operable to receive a commanded gap signal comprising commanded gap data representative of the commanded gap distance to be maintained between the following and leading vehicle;
the logic is executable by the processor to:
determine a distance between the commanded gap distance and the relative position between the associated following and leading vehicles sensed by the forward distance sensor; and
selectively generate gap exceeded data representative of a value of the difference relative to a predetermined a gap limit value stored in the non-transient memory device.

10. The system according to claim 9, further comprising:
a communication transmitter operatively coupled with the platoon control unit, the communication transmitter being operable to:
convert the gap extended data into a gap extended signal; and
transmit the gap extended signal from the associated following vehicle to the set of platooning vehicles comprising the associated leading vehicle, the gap exceeded data being selectively usable by the associated leading vehicle to adjust a commanded gap distance to be maintained between the associated leading vehicle and an associated non-platooning vehicle forward of the platoon on the associated roadway.

11. A method for determining a relative braking capability between an associated following vehicle and one or more vehicles of a set of platooning vehicles comprising an associated leading vehicle and one or more associated following vehicles cooperatively travelling as a platoon along an associated roadway, the method comprising:
providing a platoon control unit in the associated following vehicle, the platoon control unit comprising a processor, a non-transient memory device operatively coupled with the processor, and logic stored in the non-transient memory and executable by the processor to determine the relative braking capability;
receiving, by a communication receiver operatively coupled with the platoon control unit, a deceleration command signal from the associated leading vehicle, the deceleration command signal comprising deceleration command data selectively usable by the associated following vehicle to effect a deceleration operation of the associated following vehicle;
sensing, by a vehicle speed sensor operatively coupled with the platoon control unit and configured to be disposed in the associated following vehicle a speed of the associated following vehicle during the deceleration operation effected by the associated following vehicle;
generating, by the vehicle speed sensor relative speed data representative of the sensed speed of the associated following vehicle;
sensing, by a forward distance sensor operatively coupled with the platoon control unit and configured to be disposed in the associated following vehicle, a relative distance between the associated following vehicle and the associated leading vehicle during the deceleration operation effected by the associated following vehicle;
generating, by the forward distance sensor, relative distance data representative of the sensed relative distance between the associated following vehicle and the associated leading vehicle,
executing the logic of the platoon control unit by the processor to generate first quantitative error rate data in accordance with a predetermined combination of the relative speed data, the relative distance data, and the deceleration command data, the first quantitative error rate data being representative of a braking capability of the associated following vehicle resulting in a difference between a commanded gap distance to be maintained between the following and leading vehicles and the relative distance between the following and leading vehicles sensed by the forward distance sensor; and
executing the logic of the platoon control unit by the processor to store the first quantitative error rate data in the non-transient memory device.

12. The method according to claim 11, further comprising:
executing the logic of the platoon control unit by the processor to:
combine the first quantitative error rate data with an average quantitative error rate data value stored in the non-transient memory device to generate an updated quantitative error rate data value; and
store the updated quantitative error rate data value in the non-transient memory device.

13. The method according to claim 12, further comprising:

converting, by a communication transmitter operatively coupled with the platoon control unit, the updated quantitative error rate data value into an updated quantitative error rate data signal; and transmitting, by the communication transmitter, the updated quantitative error rate data signal from the associated following vehicle to the associated leading vehicle and to the one or more associated following vehicles.

14. The method according to claim 11, further comprising:

converting, by a communication transmitter operatively coupled with the platoon control unit, the first quantitative error rate data into a first quantitative error rate data signal; and transmitting, by the communication transmitter, the first quantitative error rate data signal from the associated following vehicle to the associated leading vehicle and to the one or more associated following vehicles.

15. The method according to claim 14, further comprising:

receiving, by the communication receiver, a forward quantitative error rate signal from an associated vehicle forward in the platoon of the associated following vehicle, the forward quantitative error rate signal comprising forward quantitative error rate data representative of a difference between a commanded gap distance to be maintained between the vehicle forward in the platoon of the associated following vehicle and a further associated vehicle forward in the platoon of the associated vehicle forward of the following vehicle.

16. The method according to claim 15, further comprising:

executing the logic of the platoon control unit by the processor to determine a difference between the forward quantitative error rate data and a predetermined threshold forward gap value stored in the non-transient memory device; and executing the logic of the platoon control unit by the processor to selectively generate, responsive to a magnitude of the difference, a re-order command signal comprising re-order command data, the re-order command data being selectively usable by the set of platooning vehicles for re-ordering the platoon in accordance with the re-order command data.

17. The method according to claim 14, further comprising:

receiving, by the communication receiver, a rearward quantitative error rate signal from an associated vehicle rearward in the platoon of the associated following vehicle, the rearward quantitative error rate signal comprising forward quantitative error rate data representative of a difference between a commanded gap distance to be maintained between the vehicle rearward in the platoon of the associated following vehicle and a further associated vehicle rearward in the platoon of the associated vehicle rearward of the following vehicle.

18. The method according to claim 17, further comprising:

executing the logic of the platoon control unit by the processor to determine a difference between the rearward quantitative error rate data and a predetermined threshold forward gap value stored in the non-transient memory device; and executing the logic of the platoon control unit by the processor to selectively generate, responsive to a magnitude of the difference, a re-order command signal comprising re-order command data, the re-order command data being selectively usable by the set of platooning vehicles for re-ordering the platoon in accordance with the re-order command data.

19. The method according to claim 11, further comprising:

receiving, by the communication receiver, a commanded gap signal comprising commanded gap data representative of the commanded gap distance to be maintained between the following and leading vehicles;

executing the logic by the processor to determine a distance between the commanded gap distance and the relative position between the associated following and leading vehicles sensed by the forward distance sensor; and executing the logic by the processor to selectively generate gap exceeded data representative of a value of the difference relative to a predetermined a gap limit value stored in the non-transient memory device.

20. The method according to claim 19, further comprising:

converting, by a communication transmitter operatively coupled with the platoon control unit, the gap extended data into a gap extended signal; and transmitting, by the communication transmitter, the gap extended signal from the associated following vehicle to the set of platooning vehicles comprising the associated leading vehicle, the gap exceeded data being selectively usable by the associated leading vehicle to adjust a commanded gap distance to be maintained between the associated leading vehicle and an associated non-platooning vehicle forward of the platoon on the associated roadway.

* * * * *